Oct. 1, 1968 M. FAVREAU 3,404,220

COLOR VIDEO SYSTEMS

Filed July 9, 1965 13 Sheets-Sheet 1

Oct. 1, 1968 M. FAVREAU 3,404,220

COLOR VIDEO SYSTEMS

Filed July 9, 1965 13 Sheets-Sheet 4

Oct. 1, 1968 M. FAVREAU 3,404,220

COLOR VIDEO SYSTEMS

Filed July 9, 1965 13 Sheets-Sheet 6

Oct. 1, 1968 M. FAVREAU 3,404,220

COLOR VIDEO SYSTEMS

Filed July 9, 1965 13 Sheets-Sheet 7

Oct. 1, 1968 M. FAVREAU 3,404,220

COLOR VIDEO SYSTEMS

Filed July 9, 1965 13 Sheets-Sheet 8

Oct. 1, 1968 M. FAVREAU 3,404,220

COLOR VIDEO SYSTEMS

Filed July 9, 1965 13 Sheets-Sheet 9

COLOR VIDEO SYSTEMS

Filed July 9, 1965 13 Sheets-Sheet 11

Oct. 1, 1968 M. FAVREAU 3,404,220

COLOR VIDEO SYSTEMS

Filed July 9, 1965 13 Sheets-Sheet 13

3,404,220
COLORED VIDEO SYSTEMS

Michel Favreau, Neuilly-sur-Seine, France, assignor to Compagnie Francaise Thomson-Houston-Hotchkiss Brandt Filed July 9, 1965, Ser. No. 470,679
Claims priority, application France, July 17, 1964, 982,025
17 Claims. (Cl. 178—5.2)

ABSTRACT OF THE DISCLOSURE

In a color TV system having red, green and blue pick-up tubes (2R, 2G, 2B), an arrangement for achieving accurate register between the color pictures comprising: a luminous frame-like reference pattern (8) arranged to be projected on the tubes to be scanned together with the televised scene so as to produce start-of-scan and end-of-scan marker pulses in each of the line and frame scan cycles; time discriminator means developing an error signal in response to a time displacement of the marker signals produced by different tubes relative to a reference marker signal, e.g. the marker signal from one of the tubes; and means applying the error signal to the scanning means of a tube to modify the scan cycles thereof so as to reduce said displacement and maintain accurate register.

This invention has as its basic object to improve the mutual register between the respective component color pictures in a color video system.

In color television systems of the so-called simultaneous type generally used at the present time, a scene to be televised is projected through suitable optics simultaneously onto a number of pick-up tubes forming part of the television camera. While color television processes are extant wherein the number of pick-up tubes may be no more than two or more than three, particular reference will hereinafter be made for convenience to the trichrome process in which there are provided three color pick-up tubes. The scene is then projected onto all three pick-up tubes through respective color filters, usually red, green and blue.

The color picture projected onto the screen of each tube is scanned by an electron beam within the tube, and produces a modulated video signal at the video output of the tube. The video signals from all three color channels are combined with one another and with certain requisite time base signals and transmitted by way of radio waves or some other suitable link. At the receiver end, the received composite signal is separated into its component color signals and these serve to modulate three electron beams, which may be provided in a common tube, while each beam is made to scan a screen in time with the scanning of the transmitter tubes. The resulting component color pictures are optically superposed to provide the final picture corresponding to the televised scene in color.

In color television systems of this general class, serious trouble has been and is still being encountered in connection with the achievement of proper register between the component color pictures provided by all of the pick-up tubes. As a result of minor discrepancies between the optical and/or electrical characteristics of the various color channels, the pictures in all of the color pick-up tubes may not be scanned under fully identical conditions, as to geometry and timing, and as a consequence the pictures of different colors fail to register with one another, resulting in an unsatisfactory picture at the receiver. Heretofore, to best of the applicant's knowledge, no solution to this problem has been available beyond the obvious expedients serving to impart to the mechanical, optical and electrical components of the pick-up system maximum stability against all external causes of disturbance, such expedients including vibration proof mounts, temperature compensation, current and voltage stabilization and so forth. All such expedients seriously increase costs but do not succeed in eliminating defective color register.

Objects of this invention include the provision of means for positively stabilizing the component color pictures in an electronic color pickup system so as to maintain at all times positive relative register therebetween; to control the scanning characteristics for the electron beams in a plurality of different simultaneously operating picture pick-up tubes so as to maintain at all times true synchronism between the simultaneous scanning operations; to achieve the above results with maximum efficiency and at minimum cost. Other objects will appear.

Broadly, in accordance with an aspect of the invention, reference markings are provided, in fixed relation to the televised scene, so as to be simultaneously projected therewith onto all of the pick-up tubes. These markings elicit marker signals at the video outputs of the respective tubes, as said markings are scanned by the related electron beams. The marker signals are separated from the remainder of the video signals in the respective channels, and are processed, as by time-comparison, so as to develop error signals in the vent of a discrepancy between the marker signals of different channels. The error signals are used to modify the scanning characteristics of one or more of the pick-up tubes until the discrepancies have been eliminated, whereupon true register is present as between the component pictures.

The invention is generally applicable to any electronic color picture pick-up system, although its chief utility lies with color television and it will therefore be described with particular reference to this application.

Exemplary embodiments of the invention will now be described in detail with reference to the accompanying drawings, wherein:

FIG. 1 schematically shows the optics of a trichrome simultaneous television camera system, provided with a "mask" interposed in said optics for providing the reference markers in accordance with the invention;

FIG. 2 is an enlarged front view of a mask according to the invention, while FIGS. 2A and 2B are partial sectional views, on an enlarged scale, on the planes A—A and B—B of FIG. 2;

Figure 1:
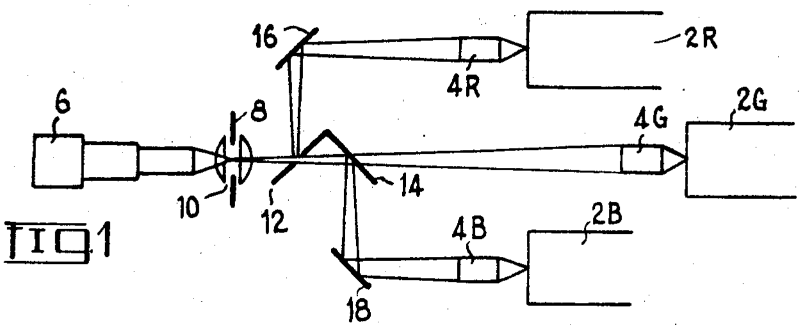

Shown in FIG. 1 is a generally conventional color television camera arrangement which includes the three color pick-up tubes 2R, 2G and 2B, in front of which are disposed the respective color filters 4R, 4G, 4B. The filters may be any suitable combination of fundamental colors as used in trichrome television and are here assumed to be red, green and blue respectively.

An objective lens unit generally designated 6 serves to form a real image of a televised scene in a plane in which is also positioned a reference mask 8 forming part of the invention to be presently described. The mask 8 is positioned between lenses constituting a field lens unit 10. The optical beam from the field lenses is split into three beams by means of a conventional beam-splitter system including the centrally-disposed semi-transparent dichroic mirrors 12 and 14, and front-surface side mirrors 16 and 18. The resulting three beams are then applied through the aforementioned filters 4R, 4G, 4B into the respective pick-up tubes 2R, 2G, 2B. Except for mask 8, this arrangement is conventional.

Figures 2, 2A, 2B:
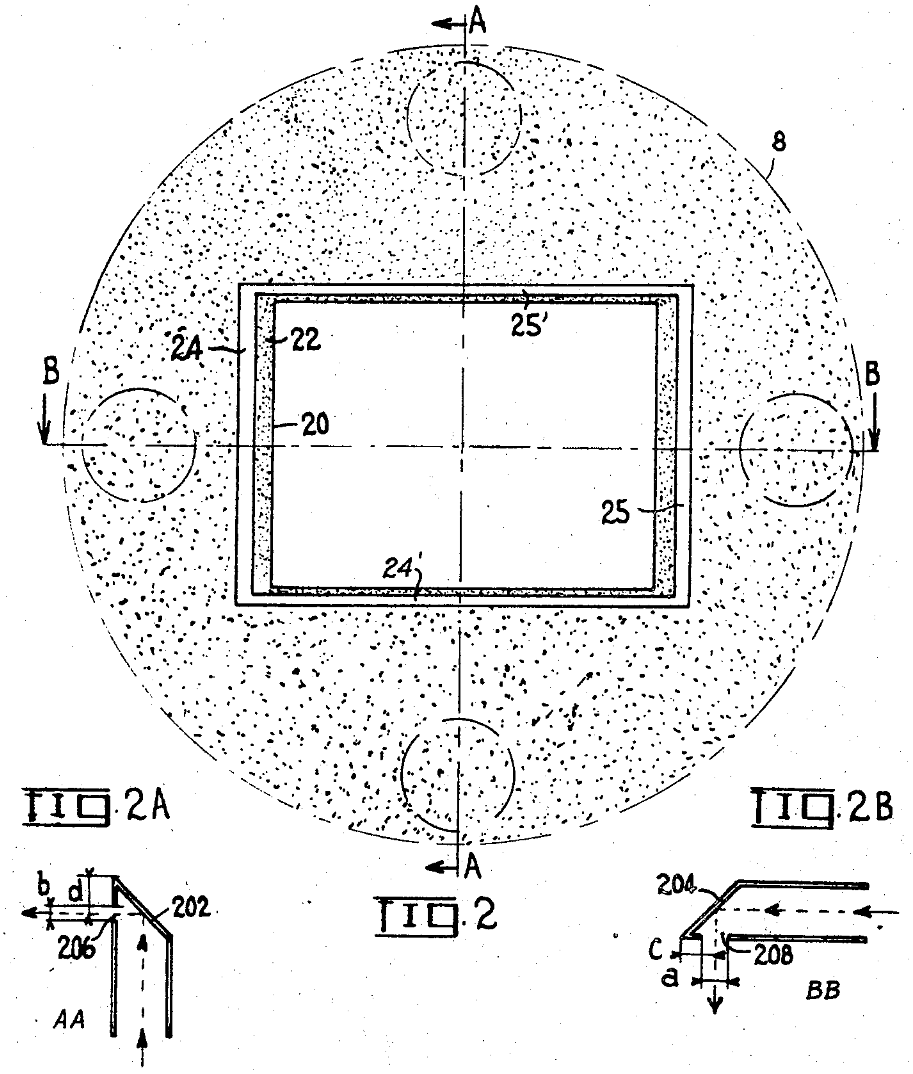

The general configuration of mask 8 is shown in FIG. 2 as comprising a dark circular disk in which is cut out a rectangular field aperture or window 20. Around the sides of this aperture and separated therefrom by a dark inner border 22 is a thin, bright, rectangular line 24, having vertical sides 25 and horizontal sides 25'. This constitutes the reference frame proper. One suitable construction for such a mask and typical dimensions relating to the reference frame will be described later.

Figure 3:
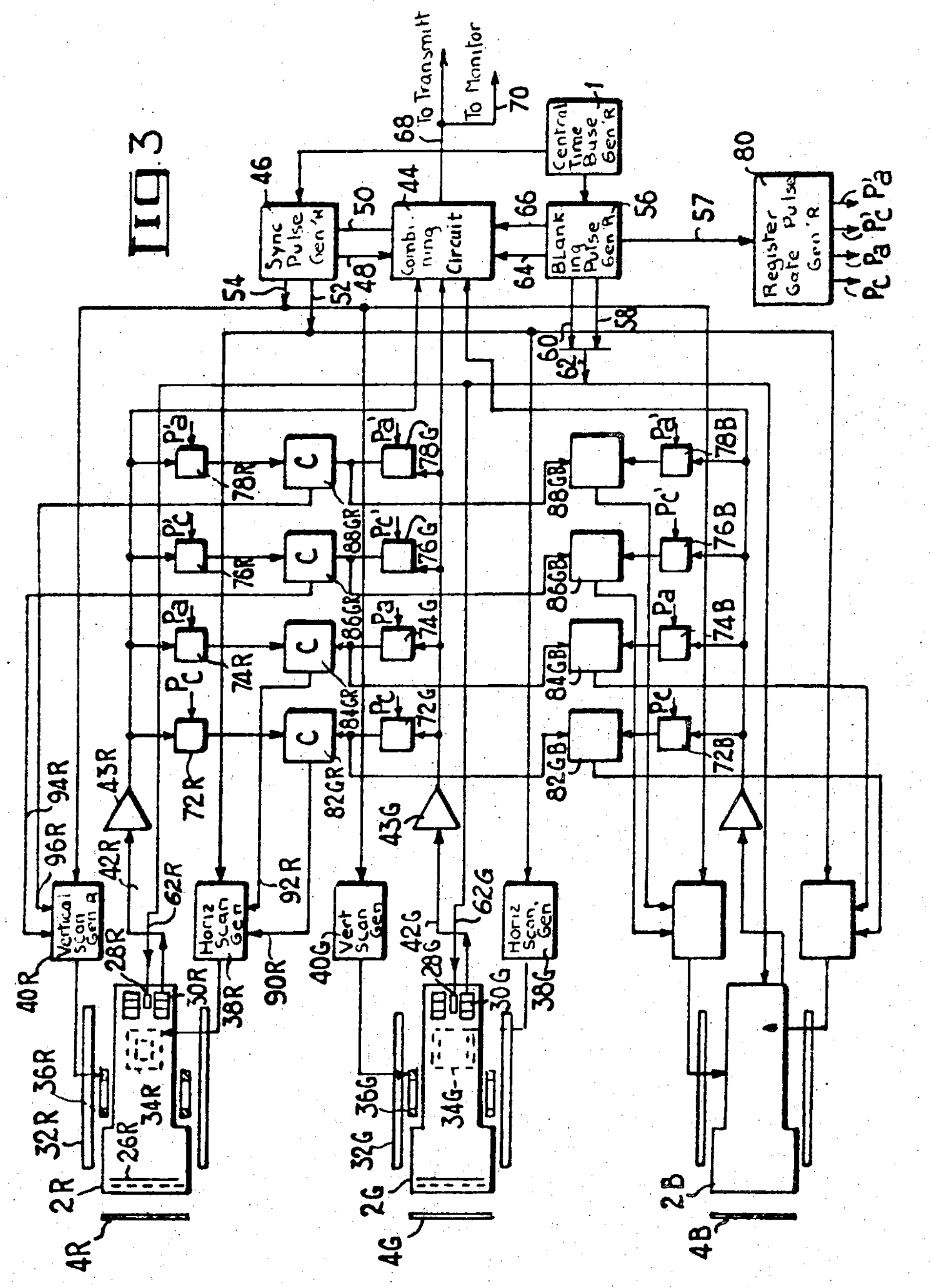
FIG. 3 is a functional diagram of one embodiment of the invention.

In the block diagram of FIG. 3, the three pick-up tubes 2R, 2G, 2B are shown by their general outline to be of the image-Orthicon type, but it is to be understood that any other suitable type of image pick-up tube may be used.

Parts in FIG. 3 that are homologous as between the three color channels are designated with the same reference numerals followed by the letters R (for red), G (for green) and B (for blue) respectively.

Each of the three pick-up tubes includes, as its main components schematically shown, a screen-and-target element 26 (R.G.B.) an electron gun 28 (R.G.B.) and surrounding electron multiplier 30 (R.G.B.), axial focussing coils 32 (R.G.B.), horizontal deflecting coils 34 (R.G.B.), and vertical deflecting coils 36 (R.G.B.), the coils constituting a deflector yoke.

In the ensuing description, certain elements present in each of the three color channels will at times be designated by their reference numeral, the suffix (R., G. or B.) being omitted for convenience where this does not introduce ambiguity.

The horizontal deflector coils 34 are connected to the output of a horizontal sweep voltage generator 38 and the vertical coils 36 are connected to the output of a vertical sweep voltage generator 40, to receive the usual saw-tooth energy waves therefrom for sweeping the electron beam from gun 28 across the target for line-scanning and frame (or field) scanning respectively.

A video signal line 42 is connected to an output terminal of electron multiplier 30 and all three video signal lines 42, 42R, 42G, 42B are applied by way of video amplifiers 43 to a combining unit 44. A synchronizing pulse generator 46 produces horizontal synchronizing pulses over a line 48 and vertical synchronizing pulses over a line 50. These pulses are applied by lines 48, 50 to the combining unit 44 which combines them with the picture signals, and are also applied as driver pulses by way of lines 52 and 54 to the horizontal and vertical sweep generators 38 and 40 associated with the respective tubes, to trigger the sweep cycles therein as later disclosed. A blanking pulse generator 56 produces horizontal and vertical beam blanking pulses over lines 58 and 60 respectively, which are applied in common by way of the lines 62 to the control electrodes included in the electon guns 28 of the respective tubes. Blanking pulse generator 56 also develops horizontal and vertical blanking or suppressor pulses of somewhat longer in duration than the related beam blanking pulses, and these suppressor pulses are applied over lines 64 and 66 to the combining unit 44. A central time base generator 1 is connected to synchronising and blanking pulse generators 46 and 56 respectively.

In the combining unit 44, the color picture signals, synchronizing pulses and suppressor pulses are combined and the composite signals applied by a line 68 to a conventional transmitter, not shown, in which the composite signals modulate appropriate carrier frequencies and are beamed from an antenna. A branch line 70 also applies the signals to a monitor circuit, not shown.

The system thus described is conventional and its operation need only briefly be summarized. In each pick-up tube 2 the electron beam from gun 28 scans the target 26 along horizontal lines by the action of horizontal sweep generator 38, and these scan lines in turn sweep the vertical dimension of the target by the action of vertical sweep generator 40. After the scanning of each horizontal line, the electron beam while flying back to the initial end of the line is blanked out by a horizontal beam blanking pulse applied over line 62 to its control electrode included in gun 28 and after the scanning of each vertical frame or field the beam while returning to the other (upper) end of the target is blanked out by a vertical beam blanking pulse applied over the same line 62.

The initiation of each line scan is triggered by a horizontal driver pulse applied to generator 38 over line 52, and the initiation of each field or frame scan is determined by a vertical driver pulse applied to generator 40 over line 54.

The beam electrons reflected back from target 26 are modulated in density in accordance with the brightness of the various surface elements of the target as determined by the illumination of the screen from the scene being televised, and the electron multiplier 30 consequently delivers over line 42 a correspondingly modulated voltage signal which constitutes the video signal. The three video signals in red, green and blue are applied to the combining unit where they are combined with the synchronizing and blanking signals for transmission as a common composite signal. The information contained in this composite signal is transmitted, and on reception the video signals are separated from the synchronizing and blanking pulses in the receiver. The three color video signals serve to synthesize the original scene on the screen of a suitable trichrome cathode ray tube of the receiver. The separated synchronizing pulses are applied to the appropriate (horizontal and vertical) sweep generators of the receiver to ensure that the beam scanning operations are effected in substantial synchronism with the transmitter scanning operations. The blanking or suppressor pulses as separated out of the received composite signal serve to blank out the receiver beams during retracing.

A serious problem that has been encountered in color television systems of this general type is that of proper register between the various color pictures. As a result of small variations between the relative scanning characteristics of the pick-up tubes, the pictures of different color fail to register accurately and the colors in the televised scene tend to run into one another on the receiver screen, giving a blurred and unsatisfactory picture. Such small variations may be caused by minute geometric displacements and distortions in the geometry of the optical system including the beam splitter device shown in FIG. 1, as well as in component parts of the pick-up tubes and their scanning control means, which displacements and distortions may in turn be due to temperature effects, mechanical vibrations, etc. Also, short and long-term variations as between the electrical characteristics of corresponding parts in the respective color channels may be responsible for such variations and consequent defective register.

In the past, this problem has required many precautions to be taken in the construction of the above-enumerated and other parts of color television systems, including vibration-proof shock-mounting, temperature compensation, high-precision voltage and current stabilization, and similar expedients. All of these have seriously increased manufacturing costs, but have not been fully effective in eliminating color register defects.

The difficulty is solved by the present invention through the provision of the register reference frame 8 earlier referred to and the associated circuitry now to be described.

As shown in FIG. 3, each of the video signal lines 42 (R, G, B) has connected thereto, beyond the amplifier 43 (R, G, B), the inputs of four gates in parallel, designated 72 (R, G, B), 74 (R, G, B), 76 (R, G, B), 78 (R, G, B). The four gates of each color channel have their respective controlling inputs supplied with four so-called register gate pulses designated P*c*, P*a*, P'*c*, P'*a*, produced by a common register gate pulse generator 80 as later explained.

Each one of four first time-comparators or discriminators 82GR, 84GR, 86GR, 88GR has its respective inputs supplied from the outputs of gates 72G and 72R, gates 74G and 74R, gates 76G and 76R, and gates 78G and 78R, respectively.

The output from time comparator 82GR is applied to a so-called mean level control input 90R of the horizontal sweep generator 38R associated with the red picture tube. The output from comparator 84GR is applied to a so-called amplitude control input 92R of said generator 38R. The output from comparator 86GR is applied to a mean level control input 94R of the vertical sweep generator 40R, and the output from comparator 88GR is applied to an amplitude control input 96R of generator 40R.

A second set of time comparators 82GB, 84GB, 86GB, 88GB have their inputs connected with the outputs of gates 72G and 72B, gates 74G and 74B, gates 76G and 76B, and gates 78G and 78B, respectively, and have their outputs connected to the control inputs of the sweep generators 38B and 40B associated with the blue picture tube, in a manner corresponding to the connections of the upper set of time comparators, and as is clearly shown in FIG. 3.

As will be later explained in greater detail, the mean level control inputs 90 and 94 of the sweep generators operate to modify the mean D-C levels of the sawtooth sweep current waves produced by the respective generators when triggered by a driving pulse received by them over lines 52 and 54. The sweep amplitude control inputs 92 and 96 serve to modify the slope, and hence the sweep amplitude of the sawtooth current waves.

The operation of the system will now be described with reference to the timing diagrams of FIGS. 4 and 5. The diagram of FIG. 4 refers to the line scan, i.e. generally the horizontal scan cycle.

Figure 5:
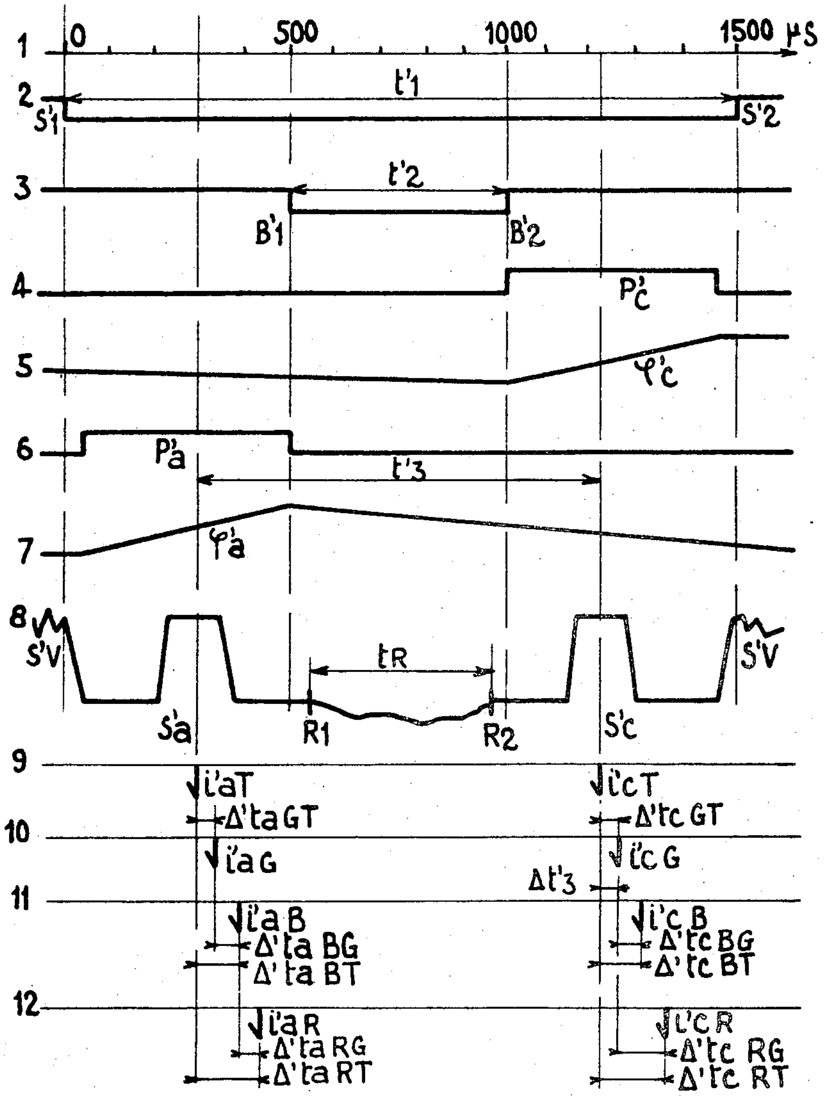
FIG. 5 is a similar time chart relating to the frame or field scan cycle.

FIG. 5 similarly refers to the frame or field scan, usually the vertical scan cycle. Both diagrams illustrate the return phase of the scan cycle which phase takes place between consecutive active scan phases, i.e. the phase during which the electron spot is flying back to its initial (left or top) position on the target screen. During most of this period, of course, the beam is blanked out by a beam blanking pulse (as later described) and no video signals are delivered by the tube over line 42.

Both the line scan and frame scan diagrams (FIGS. 4 and 5) are essentially similar, differing only in the time scale used. The ensuing description will refer mainly to FIG. 4.

Figure 4:
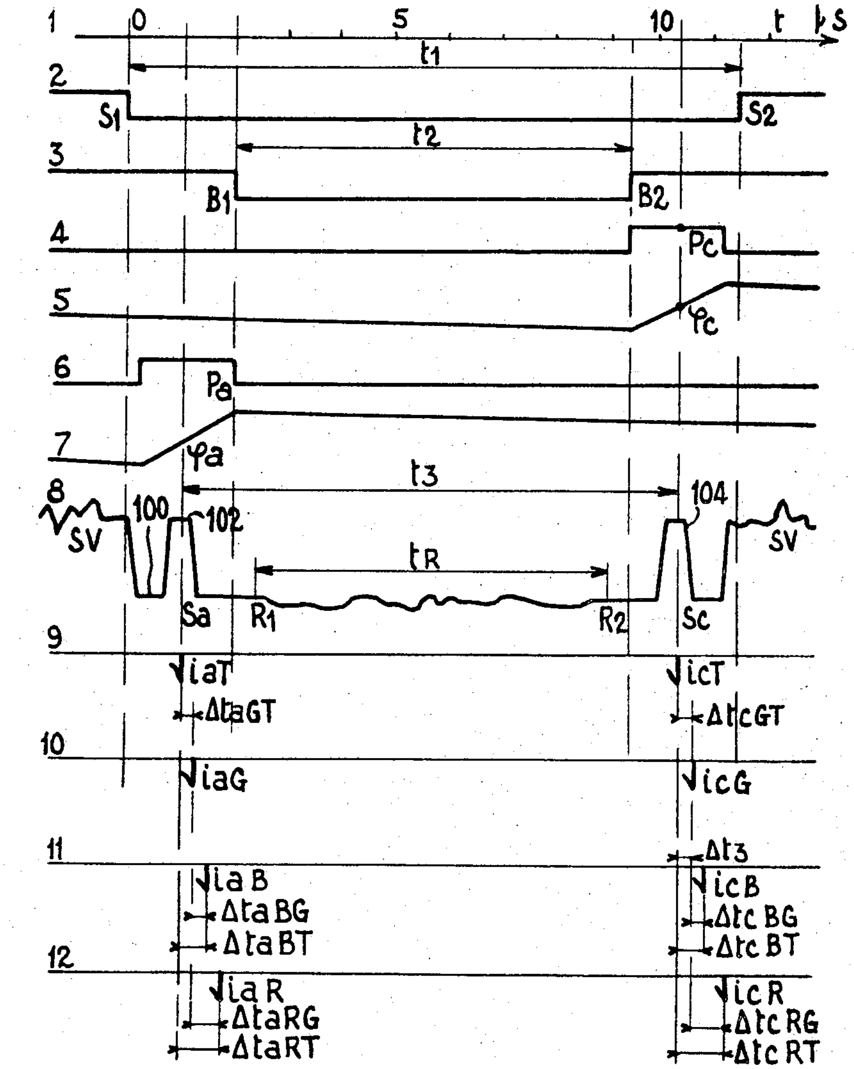
FIG. 4 is a time chart relating to the line scan cycle, and showing various signals pertinent to the invention.

The top line in FIG. 4 shows the time scale, in microseconds, and it will be seen that the return phase of the line scan cycle lasts approximately 10 microseconds. As shown by the top line of FIG. 5, the return phase of the frame scan cycle lasts approximately 1500 microseconds. It may here be indicated that the specific embodiment being described utilizes the 625 lines French television standard with 50 frames per second.

Attention is now directed to line 8 of FIG. 4, which shows the voltage delivered over the video output line 42 of any one of the pick-up tubes 2. At the far left of the waveform on line 8 is shown the endmost portion of the video signal (SV) pertaining to the scan line immediately preceding the return period shown in the diagram, and at the far right is similarly shown an initial segment of the video signal (SV) pertaining to the next line to be scanned. It will be seen that the video signal at the left of the chart, near the termination of the scanning of said preceding line, undergoes a sharp depression in brightness as at 100, which corresponds to the time the spot encounters the right side of the dark inner border 22 image of the reference mask 8 of the invention (see FIG. 2). The video signal then rises in a relatively sharp and well defined peak 102 at the instant the spot moves past the image of the thin bright vertical line constituting the right vertical side 25 of the reference frame 24 provided in said mask. The video signal is thereafter again depressed as the spot travels over the image of the dark outer border of the mask, and remains depressed at a low level of brightness throughout the return phase of the scan cycle (as the horizontal deflection field reverses) owing to the electron beam being at this time blanked out by the blanking pulse B. This blanking pulse B is indicated as B1–B2 in line 3 of the chart and is shown as extending from about 2 to about 9.5 microseconds, when the time origin 0 is taken at the leading edge of the depression 100.

At about time 9.5$\mu$s. the blanking pulse B is removed from the control electrode of the electron gun 28G and the sign of the deflection field again reverses to cause the spot to travel rightward again in a new line scan cycle. As the spot moves past the image of the dark outer border at the left of the frame, the video signal delivered on line 42 remains low. Then this video signal rises to a peak 104 as the spot flies past the image of the left vertical side of the bright reference frame 24, followed by a further depression corresponding to the image of the left vertical side of the inner mask border 22. Thereafter the video signal rises to significant amplitudes as the spot scans the next line of the frame.

It is therefore seen that immediately after terminating and immediately before starting each rightward horizontal line scan, the spot produces a sharp, well-defined marker pulse, respectively S*a* and S*c*, which is unmistakable in that it is separated from the video signals of the frame by a depression caused by the image of the dark inner border 22 of the mask.

In the same manner, referring to FIG. 5 in which features corresponding to features in FIG. 4 have the same references primed it is seen that immediately after terminating and immediately before starting each downward vertical frame scan, the spot produces a well-defined marker pulse, respectively S'*a* and S'*c*, which is separated from the video signals of the frame by a depression caused by the image of the dark inner mask border 22.

The four types of reference marker signals S*a*, S*c*, S'*a*, S'*c*, are separated from the video signal in the four parallel gates 72, 74, 76, 78 (R.G.B.). These, as already indicated, are opened by the register gate pulses P*a*, P*c*, P'*a* and P'*c*.

As will be evident from FIGS. 4 and 5, these register gate pulses are suitably timed to achieve the desired selective separation of the four marker pulses from one another and from the video signal, and the manner in which said gate pulses can be produced to achieve this purpose will presently be made clear.

Turning to lines 3 of FIGS. 4 and 5, these show at B1 B2 and B′1 B′2 the beam blanking pulses previously referred to. Lines 2 of said figures show at S1 S2 and S′1 S′2 the transmitted blanking pulses that serve to blank out the beams in the receiver. As shown these transmitted blanking pulses S and S′ are timed to overlap the corresponding beam blanking pulses B and B′, such overlap being a safeguard against the display of spurious signals on the receiver screen. The register gate pulses P*c*, P*a*, P′*c* and P′*a*, are timed to extend during the respective periods of overlap between the B and S pulses, and the B′ and S′ pulses respectively, as is clearly apparent from the chart, and as a consequence the reference frame will not be displayed on the receiver screen, in the embodiment of the invention here disclosed.

The following general procedure may be used to produce the register gate pulses. For producing the end-of-scan gate pulses P*a* and P′*a*, a bistable multivibrator or flip-flop may be provided which will be set to one state by the negative-going leading edge S1 (or S′1) of the S (or S′) pulse and reset to its other state by the negative-going leading edge B1 (or B′1) of the B (or B′) pulse. A very short delay may suitably be introduced between the occurrence of the negative-going leading edge S1 (or S′1) and the initiation of the P*a* (or P′*a*) gate pulse, as shown in FIGS. 4 and 5. For producing the start-of-scan gate pulses P*c* and P′*c*, a monostable circuit may be used which is set to its non stable state by the positive-going trailing edge B2 (or B′2) of the beam blanking pulse B (or B′) and arranged to fall back into its single stable state after a predetermined period, somewhat before occurrence of the positive-going trailing edge S2 (or S′2) of the S (or S′) pulse. Since suitable circuitry for achieving this kind of operation is quite conventional and will be easily designed by those familiar with the art, it has not been illustrated beyond the schematic showing of a connection 57 from the blanking pulse generator 56 to the register gate pulse generator 80 in FIG. 3.

On line 10 of FIG. 4 the marks *ia*G and *ic*G indicate the times of occurrence of the end-of-line scan marker pulses S*a* and start-of-line scan marker pulses S*c*, respectively, in the green channel. Similarly, on line 10 of FIG. 5, marks *i′a*G and *i′c*G indicate the times of occurrence of the end-of-frame and start-of-frame scan marker pulses S′*a* and S′*c* respectively.

The corresponding time points are shown at *ia*R and *ic*R (line 12, FIG. 4) and *i′a*R and *i′c*R (line 12, FIG. 5) for the red channel; and are shown at *ia*B and *ic*B (line 11, FIG. 4) and *i′a*B and *i′c*B (line 11, FIG. 5) for the blue channel.

It will be noticed from FIGS. 4 and 5 that corresponding time marks are shown as being non-coincident. Thus marks *ic*G, *ic*R and *ic*B are all somewhat displaced as between one another. The same has been indicated for marks *ia*G, *ia*R and *ia*B as between one another. Similar time discrepancies between corresponding time marks are indicated in FIG. 5. Such a situation indicates a defect in register between the three color pictures, the situation the present invention operates to correct.

As shown in FIG. 3, the red marker pulses appearing at the output from gates 72R–78R are time-compared with the green marker pulses from gates 72G–78G by being applied to the two inputs of respective time-comparators or discriminators, 82GR–88GR and similarly the blue marker pulses from gate 72B–78B are time-compared with the green marker pulses by being applied to the inputs of time comparators 82GB–88GB. In other words, in the embodiment being described the green picture is used as a reference picture and the remaining color pictures are shifted into register therewith.

The time comparators or discriminators 82–88 (GR, GB) may be of any suitable type, well-known in the art, each producing an error D-C voltage at its output which corresponds in magnitude and polarity with the sense and amount of time displacement present between the pulse signals applied to the inputs of the comparator. An exemplary embodiment thereof will be described later with reference to FIG. 14. The error voltages from the time-comparators 82–88 (GR, GB) are passed to appropriate control inputs of the sweep generators 38R, 40R, 38B, 40B, of the red and blue tubes. The characteristics of the sawtooth sweep currents for these tubes are thereby modified in a manner to bring the line marker pulses S*c* and S*a* and frame marker pulses S′*c* and S′*a* as picked up by both the red and blue tubes into accurate time coincidence with the corresponding marker pulses as picked up by the green tube, thereby nullifying the error voltages at the outputs from the respective time discriminators. This restores the red and blue pictures into accurate register with the green picture and hence restores mutual register of all three color pictures.

Figure 6:
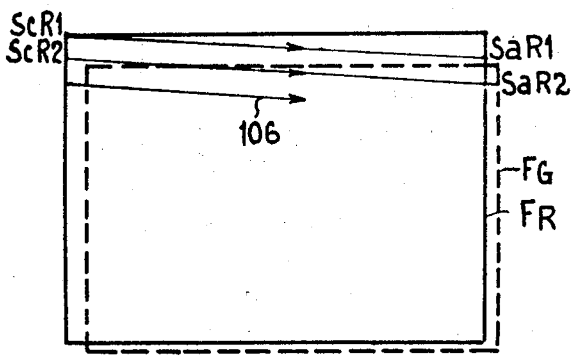
FIG. 6 is an explanatory diagram of the process through which mutual register is accomplished in accordance with the invention.

A more detailed explanation of this operation will now be given with reference to FIGS. 6 and 7. In FIG. 6 the full-line rectangle FR represents the image of the rectangular reference frame 24 as picked up by the red tube 2R. Rectangle FG in dashed lines indicates the image of the reference frame as simultaneously picked up by the green tube 2G selected as the reference tube in the embodiment being described. It will be noted that the two rectangules are non-coincident, rectangle FR being shown shifted both leftward and upward, and furthermore slightly enlarged, with respect to rectangle FG. This denotes one example of defective register (greatly exaggerated in the drawing) between the red and green pictures.

Representative scan lines across the screen of the red tube 2R are indicated as at 106. The rightward arrowheads indicate the active phase of spot travel during any line scan cycle. The leftward retrace sections of the paths, during which the beam is blanked out, have not been indicated. The illustrated discrepancy between the two rectangles indicates that the initial marker signals S*c*R1, S*c*R2, etc., as picked up by the red tube 2R occur somewhat later in the scan cycle than their prescribed times as dictated by the position of the left vertical side of the green rectangle FG. Further, each red scan line is somewhat longer than its prescribed length as dictated by the horizontal dimension of said green rectangle.

Figure 7:
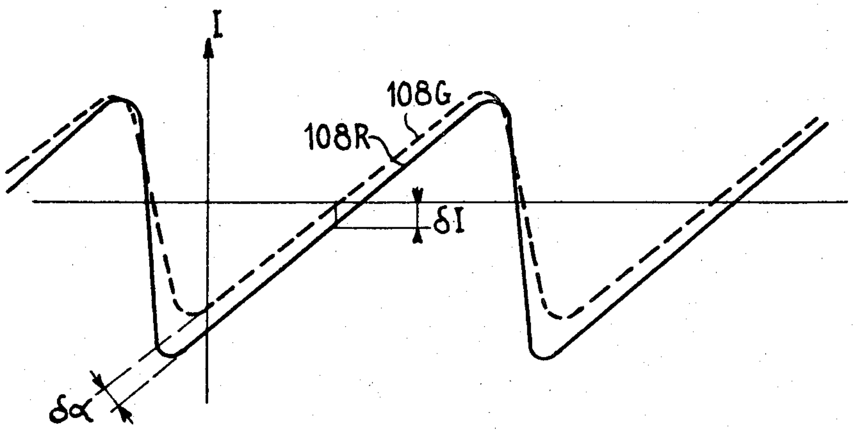
FIG. 7 is a chart of a scanning sawtooth wave produced in a scanning generator, and explains the process through which the sawtooth wave is modified, through modification of the sawtooth generator operating characteristics, to maintain mutual register between the scanned color pictures.

Referring to the sawtooth wave graph of FIG. 7, the geometric discrepancies just noted are there translated into terms of time relationships in the scan cycles. The dashed-line waveform 108G represents the sawtooth current wave produced by the line scan generator 38G associated with the green pickup tube and the full line waveform 108R is the corresponding wave produced by the line scan generator 38R associated with the red pickup tube.

In order to restore the red current wave 108R into coincidence with the green current wave 108G, in accordance with the invention two different actions are simultaneously applied. First, the mean current level of the red wave 108R is altered by the amount indicated as $\delta I$; secondly the slope of the red wave 108R is altered by the angle indicated as $\delta\alpha$. When both actions have been performed the red sweep wave 108R coincides with the green sweep wave 108G and rectangle FR (FIG. 6) coincides with reference rectangle FG as to its horizontal position and dimension. The picture formed by red pickup tube 2R will then be in accurate register, horizontally, with the picture formed by green pickup tube 2G.

Figure 11:
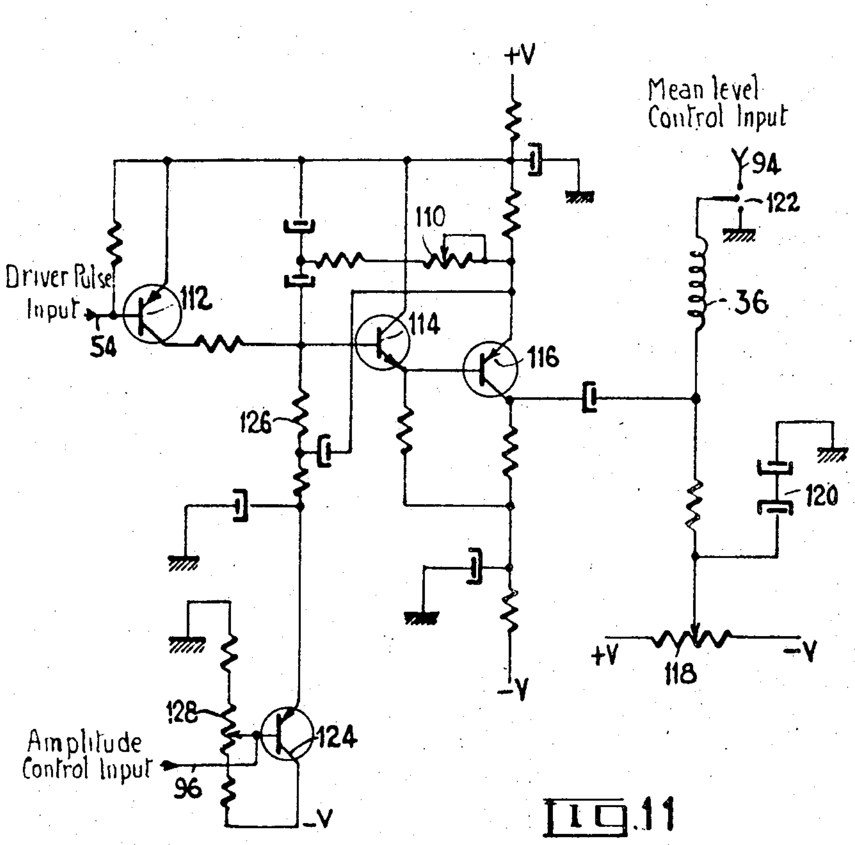
FIG. 11 is an electric circuit diagram of one form of vertical (or frame) scanning generator modified for the purposes of the invention.
Figure 12:
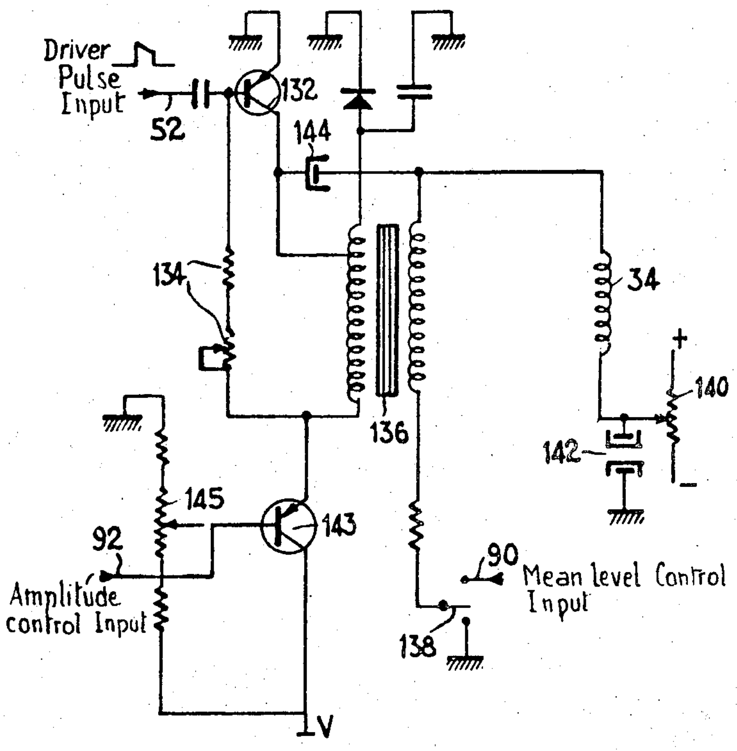
FIG. 12 is a similar diagram of a horizontal (or line) scanning generator.

The first of these two actions, varying the mean current level in sawtooth generator 38R, is accomplished by applying the error signal from comparator 82GR indicative of the time displacement $\Delta t c$RG (FIG. 4) between the green time mark *ic*G and the red time mark *ic*R during gating period P*c* to the mean level control input 90R of the generator 38R. The effect of this error signal is to alter the mean current level developed by the generator, as for instance by applying a slowly varying ramp signal to generator 38R for algebraic addition with the normal deflection current applied to the horizontal deflector coils 34R. Examples of suitable circuitry will be described later (FIGS. 11 and 12).

The second action, varying the slope of the sawtooth wave, is effected by applying the comparator error signal derived by the comparator 84RG indicative of the time displacement Δ*ta*GR between, the green and red time marks *ia*G and *ia*R as produced during gating period P*a*, to the amplitude control input 92R of generator 38R. The desired effect of varying the gain of the sawtooth wave by the error signal can again be obtained in any of various ways that will readily suggest themselves, as by acting on the gain of an amplifier stage in the generator 38R, and exemplary circuitry in this respect will be described later.

Vertical or frame scan sawtooth generator 40R is controlled in a manner analogous to horizontal or line scan sawtooth generator 38R by means of error signals applied to its mean level and gain control inputs 94R and 96R from time comparators 86GR and 88GR. It is believed superfluous to go further into the details of these control actions at this point.

Thus the rectangle FR traced out on the screen of the red pickup tube 2R in response to the bright rectangular reference frame 24 in the mask 8 of the invention, is brought into accurate register both as to its horizontal and vertical positioning and as to its horizonal and vertical dimensioning, with the corresponding rectangle FG formed on the screen of green pickup tube 2G. The televised picture in red is accordingly brought into register with the televised picture in green. Identical functions performed by the error signals from comparators 82GB–88GB similarly serve to bring the televised picture in blue into precise register with the televised picture in green, thereby achieving full register between the three color picures of the trichrome system.

If desired, the register marker pulses generated in the transmitter system in response to the reference frame 24 in the general manner described herein may, in a modification of this system not here described, be transmitted together with the television signals to the receiver in order to perform analogous register-controlling functions at the receiver end.

Another embodiment of the invention will now be described with reference to FIG. 8. In this case, instead of deriving error signals from the displacements of two of the color marker pulses (red and blue) with respect to the third (green) color marker pulse and applying the error signals to the sweep generators of the first two color tubes, as in FIG. 3, error signals are derived from the displacements of each of the three color marker pulses from a common reference, and are applied to the sweep generators of all three color tubes.

Figure 8:
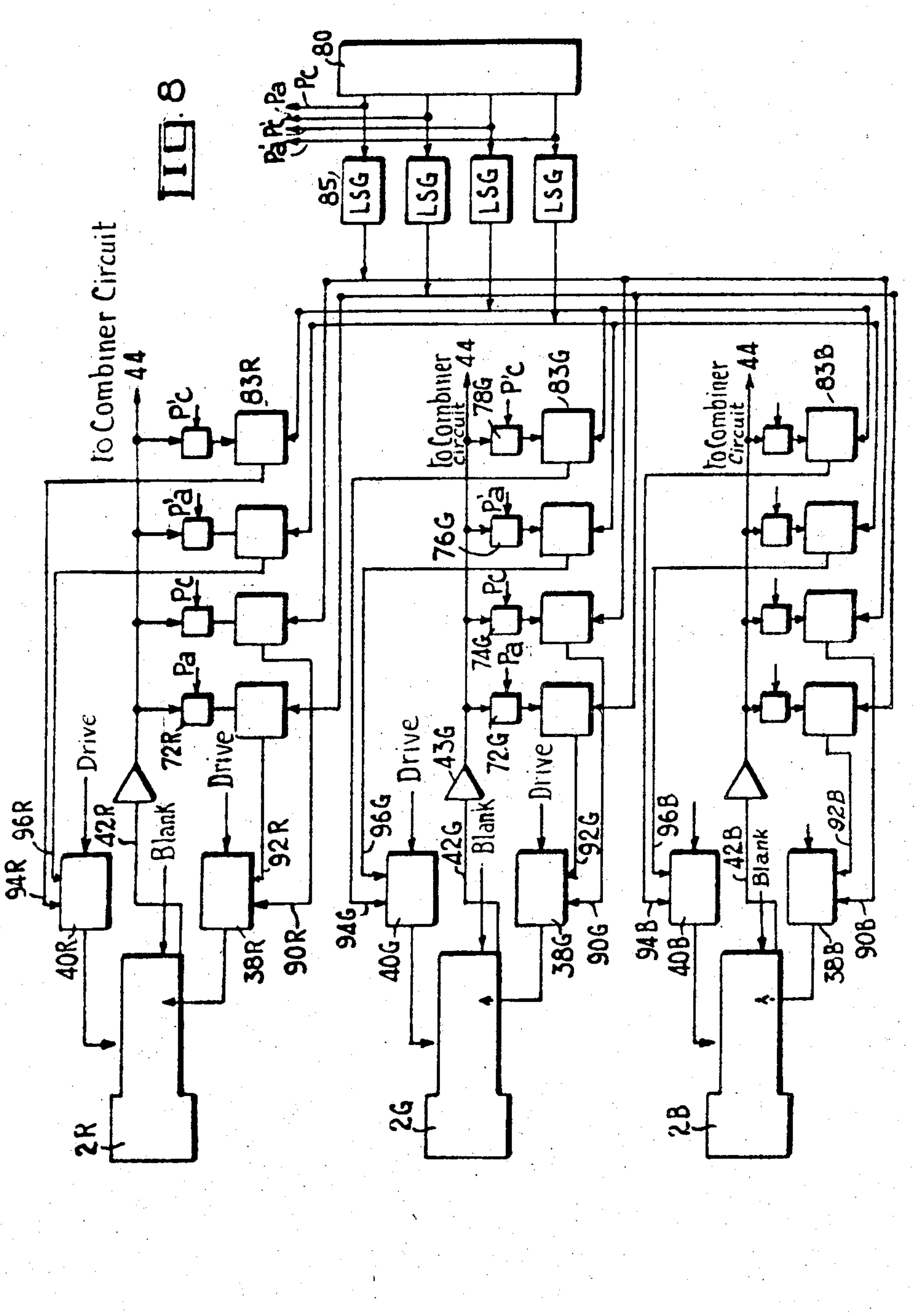
FIGS. 8, 9 and 10 are functional diagrams generally similar to FIG. 3, but with some parts omitted, and relating to different embodiments of the invention.

It will be noted that in FIG. 8 all three color channels are alike. Connected to the video signal output line 42 (R, G, B) in each channel are four gates 72 (R, G, B) the outputs of which are connected to the one inputs of four time discriminators 83 (R, G, B). The second inputs of these time discriminators are connected to the outputs of the register gate pulse generator 80 by way of linear sawtooth generators 85. The outputs of the time discriminators 83 are applied to the mean level control input and the amplitude control input of the horizontal and vertical scan generators 38 (R, G, B) and 40 (R, G, B) in each channel. The system works as follows.

The linear sawtooth generators 85 operate to derive from each of the four register gate pulses P*c*, P*a*, P'*c*, P'*a*, a related linear sawtooth voltage wave of the type shown in lines 5 and 7 in each of FIGS. 4 and 5. This sawtooth wave includes a relatively steep rising front (φ*c*, φ*a*, φ'*c*, φ'*a*) coextensive with the related register gate pulse, and a long gently sloping return period. The generators 85 may comprise simple R-C integrator networks acting to integrate the associated gating pulses and then allowing the integrated voltage to leak off gradually back to zero. The time discriminators 83 in this instance serve to compare the time of occurrence of each of the color marker pulses delivered on each of the three video output lines 42 (R, G, B) with the mid-time instant of the related sawtooth wave period φ*c*, φ*a*, φ'*c*, φ'*a*, and to produce an error-signal corresponding in polarity and magnitude to the sense and amount of displacement therebetween. This is a conventional time discriminating function involving a sampling of the voltage value of the linear sawtooth wave at the instant of occurrence of the related marker pulse. If for instance the green start-of-line-scan marker pulse *ic*G (FIG. 4, line 10) lags behind the mid-period *ic*T of the linear wave φ*c* derived from the start-of-line register gate pulse P*c*, then the related one of the four time discriminators 83G, delivers an error voltage of a certain polarity to the mean level control input 90G of the line-scan sweep generator 38G, while if pulse *ic*G leads, then the error voltage polarity is reversed. The same type of operation applies in respect to the start- and end-of-line-scan marker pulses *ic*G, *ic*R, *ic*B, and *ia*G, *ia*R, *ia*B of all three color channels, and also to the start- and end-of-frame scan marker pulses *i'c*G, *i'c*R, *i'c*B, and *i'a*G, *i'a*R, *i'a*B (FIG. 5) of all three color channels.

It will be readily apparent that the error signals applied to the control inputs of both scan generators 38 and 40 for each color tube operate in the general manner described with reference to FIGS. 6 and 7 to modify the characteristics of the line and frame sweep generators until the error signals have been nullified. When this has been achieved in respect to all three color channels, the three reference frames such as F (R, G, B, cf. FIG. 6) formed by each color tube in response to the common reference frame 24 of the mask 8 of the invention, all coincide with a common ideal geometric position as determined by the time base of the system, and hence the three color pictures are in register.

Comparing the relative merits of the two embodiments of the invention so far described, it is noted that the first embodiment (FIG. 3) has the advantage of somewhat greater simplicity in the circuitry required. Another advantage of the FIG. 3 embodiment lies in the more direct character of the register error correcting action applied. That is, in the event of a small fluctuation in the sweep timing of the reference tube (green) relative to the time base, precise color register will still be maintained since the correcting action is referred to the reference image, green, and does not depend on the time base. However, in such case, slight fluctuations in the over-all bodily position of the picture on the screen can occur, albeit without destroying the mutual register between the component colors. The FIG. 8 embodiment will prevent such bodily picture fluctuations since the register error correction is referred exclusively to the time base signals and hence is not dependent on any individual fluctuations in any one color image. However, there is a possibility of somewhat less stringent control over the mutual register between the component colors.

Figure 9:
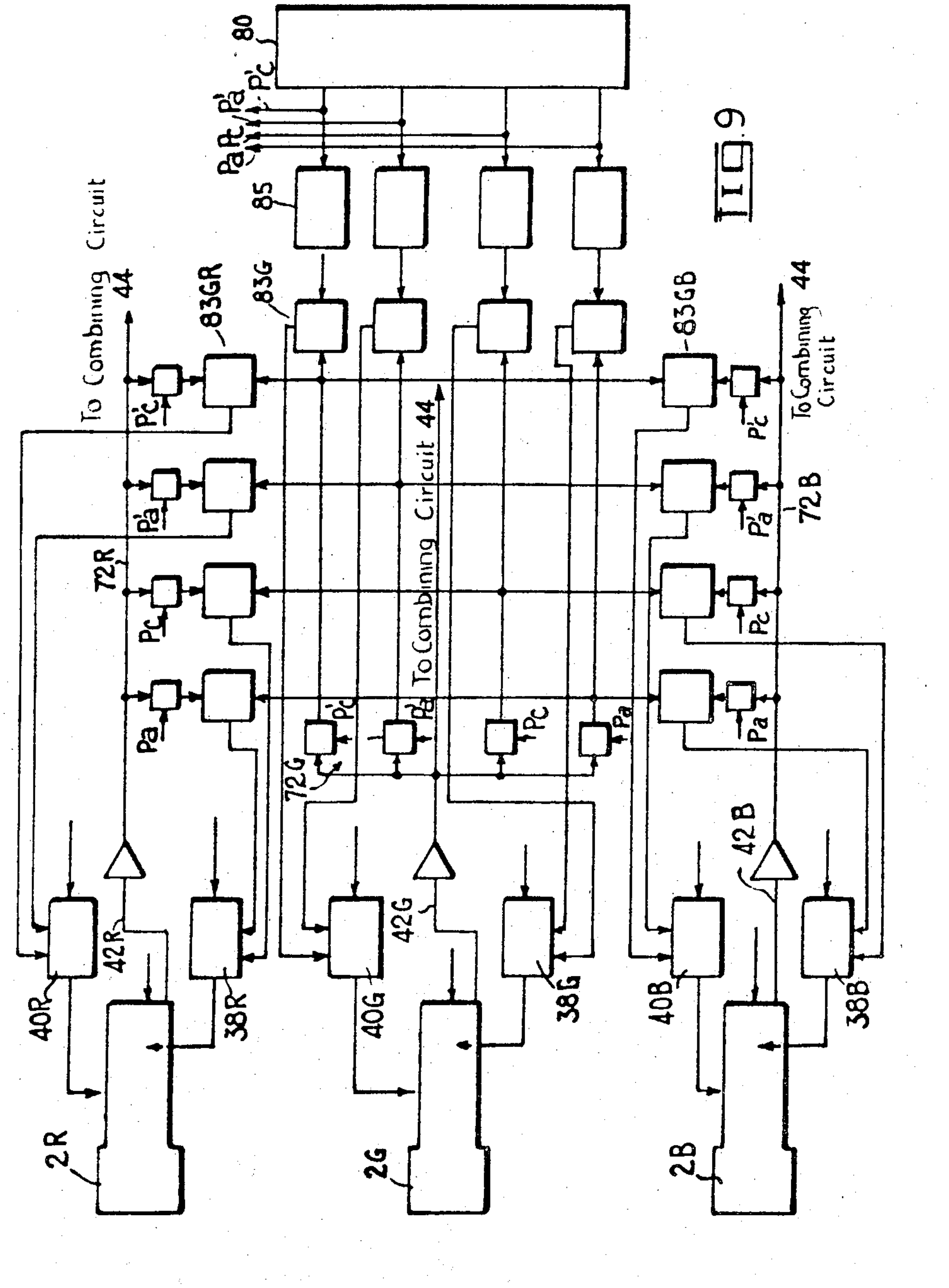

The embodiment now to be described with reference to FIG. 9 is a combination or hybrid of the two embodiments of FIGS. 3 and 8 and combines the advantages of both, but is somewhat more costly in the amount of equipment required.

In FIG. 9, as in FIG. 8, linear sawtooth waves are derived from each of the four register gate pulses P*c*, P*a*, P'*c*, P'*a* by means of the linear sawtooth generators (L, S, G) or integrators 85. However, these sawtooth voltage waves are applied for sampling to the second input of only the four time discriminators 83G associated with the green channel. The outputs from these time discriminators control the sweep characteristics of the green line and frame scan generators 38G and 40G. The time comparators 83GR and 83GB respectively associated with the red and blue channels each have their second inputs supplied with the marker pulses from the green channel, as in the embodiment of FIG. 3. In this arrangement therefore, the green image is position-stabilized by varying its sweep characteristics under control of the time base signals, whilst the red and blue images are position-stabilized through varying their sweep characteristics under control of the green image position. In this way precise synchronism is achieved both as between the three color pictures and between the color pictures and the time base of the system. The resulting picture is fully stabilized both as to its general position on the screen and as to the mutual register of its component colors.

Figure 10:
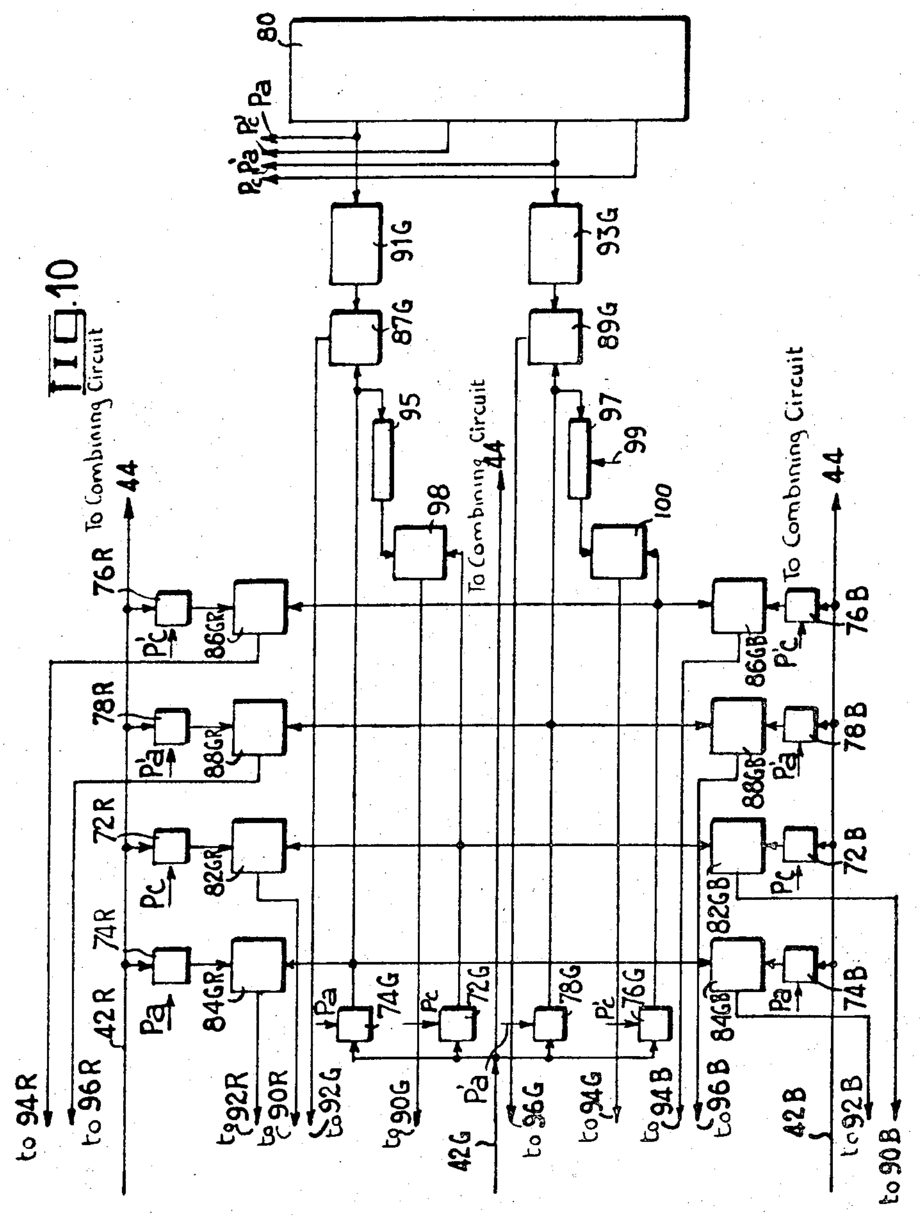

A further modification of the invention is illustrated in FIG. 10. In this instance the error signals for controlling both the mean level control inputs 90 (R, B) and 94 (R, B) and the amplitude control inputs 92 (R, B) and 96 (R, B) of both the line and frame sweep generators of each of the red and blue pick-up tubes (not shown in this figure) are derived in a manner generally similar to that disclosed for both the embodiment of FIG. 3 and that of FIG. 9; that is, by way of time comparators 82–88 (GR, GB) respectively, having their one inputs fed with the red or blue marker pulses through the respective gates 72–78 (R, B), and having their second inputs fed with the corresponding green marker pulses through the gates 72–78 (G). The error signals for the amplitude control inputs 92G and 96G of the line and frame sweep generators of the green tube, are likewise derived in a manner similar to that disclosed for preceding embodiments (FIGS. 8 and 9), that is, by way of time discriminators 87G and 89G having their one inputs fed with the green marker pulses through the gates 74G and 78G and having their second inputs fed by way of the sawtooth generators (integrators) 91G and 93G which integrate the register gate pulses P*a* and P'*a* into linear sawtooth waves.

However, the error signals for the mean level control inputs 90G and 94G of the green tube sweep generators are here obtained in a different manner. As shown, the end-of-line scan marker pulses and end-of-frame scan marker pulses derived through gates 74G and 78G in the green video channel, are passed through delay or storage devices 95 and 97 respectively, which impart delays thereto corresponding to the prescribed time periods, indicated as $t3$ and $t'3$ in FIGS. 4 and 5, that are to lapse between the termination of one (line or frame) scan cycle and the start of the next scan cycle, as determined by the separation between the corresponding register marker pulses. The retarded marker pulses from the outputs of devices 95 and 97 are applied to the one inputs of respective time comparators 98 and 100, the second inputs of which receive the start-of-scan marker pulses derived through gates 72G and 76G respectively.

It will be apparent that the error signal voltages from the comparators 98 and 100 when applied to the mean-level control inputs 90G, 94G of the green scan generators 38G and 40G, will act to stabilize the initiation of the green scan cycle in accordance with the prescribed time lapse as determined by devices 95 and 97. The delay device 95 can be a simple delay line imparting the desired short time delay (9.5$\mu$s in the illustrated example). On the other hand the device 97, which will have to impart a substantially longer period of delay or storage for the end-of-frame scan marker pulses applied to it, (about 900$\mu$s in the example, as shown in FIG. 5) is preferably constructed as a storage device, such as a multivibrator, having a triggering input 99 receiving control pulses from the time base of the system. The storage 97 may alternatively be provided as a counter acting to count a prescribed number of clock pulses from the time base.

It will be seen that in this embodiment, the mean level of the sawtooth waves produced by the scan generators 38G and 40G, which determines the instant of effective initiation of the scan cycle are controlled in a manner entirely independent from the control of the amplitudes of said sawtooth waves, which determine the effective duration of the scan cycle, and are controlled to depend only on the time base. Such a procedure may be advantageous for the following reason. When the sweep amplitude control and mean sweep level control are made interdependent as in the embodiments of FIGS. 3, 8, 9, or similar embodiments of the invention, the consequent interaction or feedback between the two correlated controls may sometimes lead to feedback instability and consequent oscillatory effects, i.e. hunting, which are objectionable. To avoid such effects in the said embodiments first described, it may be necessary to select the various time constants and circuit characteristics involved with some care. These complications are eliminated in embodiments of the invention operating on the modified principle described with reference to FIG. 10.

Various other suitable embodiments will readily occur to those familiar with the art after studying the disclosure, as by appropriately combining certain features of FIGS. 3, 8, 9 and 10. As one example of such further modification, the error signals for the mean scan level control inputs 90 (R,B) and 94 (R,B) for the red and blue tubes, instead of being derived from time comparators interconnecting the video channel of the red or blue tube under consideration with the video channel of the green tube, as shown, may be derived from time comparators or discriminators having their second inputs operated from the register gate pulses (as in FIG. 8), or from time comparators having their second inputs supplied with delayed end-of-scan marker pulses, as shown for the corresponding comparators in the green channel of FIG. 10. A large number of further variations will be readily conceived.

Reference will now be made to FIGS. 11–14 for a description of some exemplary circuits suitable for use in the invention to provide the tube scan generators (38 and 40) having the improved scan control means here disclosed, as well as the time comparators and discriminators serving to develop the error signals therefor, as herein disclosed.

FIG. 11 illustrates a suitable circuit usable for the vertical or frame scan generators 40 in the invention. The circuit is generally conventional and operates to apply a sawtooth current waveform to the vertical deflector coils 36 of the pick-up tube with which the circuit is associated, under control of the driver pulses applied by the driver input line 54 (from sync pulse generator 46 e.g. FIG. 3) to the base of an input transistor stage 112 of the circuit. The sawtooth wave is amplified in the two-stage transistor amplifier 114–116 and is applied by way of a capacitor to one terminal of the vertical deflector coil 36. Said coil terminal is also connected through a resistor to an adjustable tap of a potentiometer 118 connected across a stable voltage source. Capacitance 120 connects the potentiometer tap to ground for leak-off of A-C components. The other terminal of coil 36 is connected through a switch 122 to the mean level control input line 94, in one position of the switch and to ground in the other position.

The mean level of the sawtooth current wave applied to coil 36 can thus be preadjusted by means of potentiometer 110, with switch 122 in its grounded position. Thereafter, with switch 122 in the upper position, the error signals applied by way of the input control line 94 will modify the mean level of the sawtooth wave for the purposes earlier explained.

Amplitude control input line 96 is connected to the base of a transistor 124 having its emitter connected through resistance 126 to the base of the first-stage amplifier transistor 114. The collector of transistor 124 is connected to a negative voltage, which is also connected through a potentiometer 128 to the base of the transistor.

The gain of the sawtooth amplifier 114–116 can thus be preadjusted by means of potentiometer 128. Thereafter error signals applied by way of amplitude control line 96 will vary the conductance of transistor 124 and hence the bias applied to the base of sawtooth amplifier transistor 114, thereby varying the gain of said amplifier and the amplitude of the resulting sawtooth wave as described.

FIG. 12 illustrates a suitable circuit for use as the horizontal, or line, scan generators 38 in the invention. This circuit is generally conventional and operates to apply a sawtooth current wave to the horizontal deflector coils 34 of the associated pick-up tube, under control of driver pulses applied over the driver input line 52 from sync pulse generator 46, by way of a capacitance, to the base of an input transistor 132. The transistor 132 is connected in series with resistance 134 across the primary of a transformer 136 having its secondary connected at one end to deflector coil 34. The other end of the transformer secondary is connectable by way of a switch 138, either to the mean level control input line 90 or to ground depending on the position of the switch. The other end of deflector coil 34 is connected through a potentiometer 140, to a stabilized voltage source. Capacitances such as 142, 144 serve for the leak-off of alternating current components.

The mean level of the sawtooth wave of induced current generated in the secondary circuit of transformer 136 and applied to deflector coil 34 can thus be preadjusted by means of potentiometer 140 when switch 138 is in the grounded position.

Thereafter, with switch 138 in its upper position, error signals applied over line 90 to the transformer secondary will modify the mean level of he sawtooth wave in accordance with the error signal for the purposes disclosed. Amplitude control line 92 is connected to the base of a transistor 143 having its emitter connected to the primary of transformer 136. The collector of transistor 143 is connected to a negative voltage and the base of the transistor is also connected to this voltage through a potentiometer 145. The amplitude of the energy wave generated in the transformer 136 can there be preadjusted with potentiometer 145, and will thereafter be varied in accordance with the error signal applied on line 92.

Figure 13:
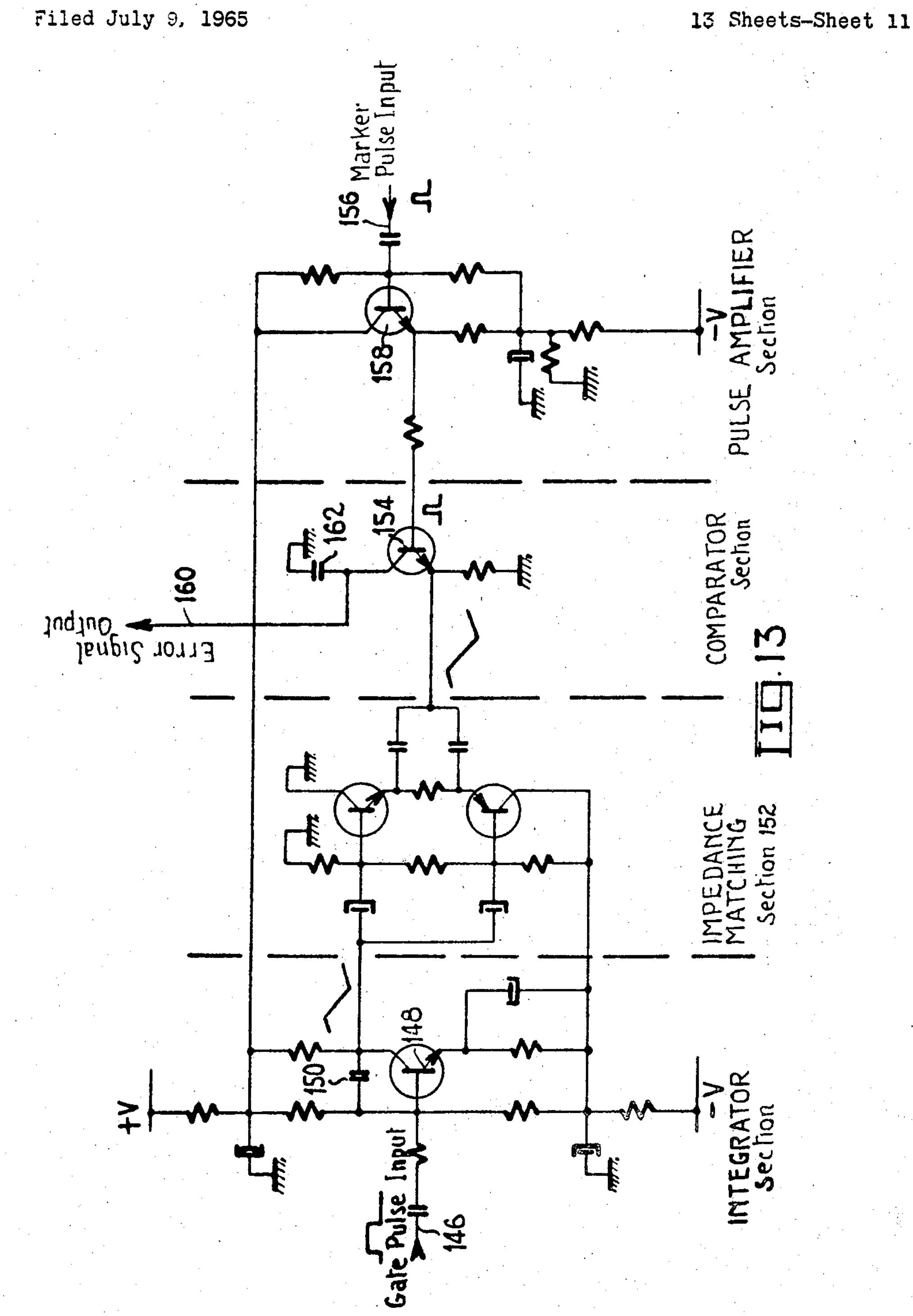
FIG. 13 is an electric circuit diagram of a form of time discriminator used in embodiments of the invention for indicating the time of occurrence of a marker pulse from a color channel with reference to a gate pulse.

FIG. 13 illustrates one form of combination linear sawtooth generator and time discriminator, of the kind represented for example by the combination of units 85 and 83G. in FIG. 9. In this circuit, the appropriate register gate pulse (Pc, P*a*, P'*c* or P'*a*) is applied over a line 146, by way of capacitance and resistance to the base of a transistor 148. This transistor is connected in circuit with a capacitance 150 and resistors as shown, to provide a conventional form of integrating amplifier network operating to derive from the register gate pulse applied by input 146 a linear sawtooth wave having a steep slope portion coextensive in time with said gate pulse. The resulting linear sawtooth wave is applied to a symmetrical, two-transistor impedance-matching stage generally designated 152, whence the low-impedance linear sawtooth current waveform is applied to the emitter of a transistor 154, in the comparator section of the circuit.

The marker pulse which is to be discriminated as to its time position with respect to the midpoint of the linear sawtooth wave derived from the register gate pulse, is applied over a line 156 to the base of a transistor 158, whose emitter is connected through resistance to the base of comparator transistor 154. Suitable biassing voltages are connected to the various transistor electrodes in a conventional manner by way of resistances as shown. An error signal output line 160 is connected to the collector of transistor 154 and through a capacitor 162 to ground.

In the absence of a marker pulse applied to input line 156 the transistor 154 is non-conductive and the lower plate of capacitor 162 remains at a constant potential e.g. zero. Application of the positive amplified marker pulse through amplifier transistor 158 to the base of comparator transistor 154 renders this latter transistor conductive and applies a potential to the lower plate of capacitor 162 which corresponds in magnitude with the instantaneous value of the linear sawtooth current from impedance-matching section 152 at the particular instant the marker pulse occurred. Hence, said potential is a measure of the time of occurrence of the marker pulse and the circuit adjustments are such that the D-C error voltage appearing on output line 160 will indicate in sense and magnitude the time displacement of the marker pulse from the midtime of the sawtooth wave, i.e. the midtime of the register gate pulse applied to input 146.

Figure 14:
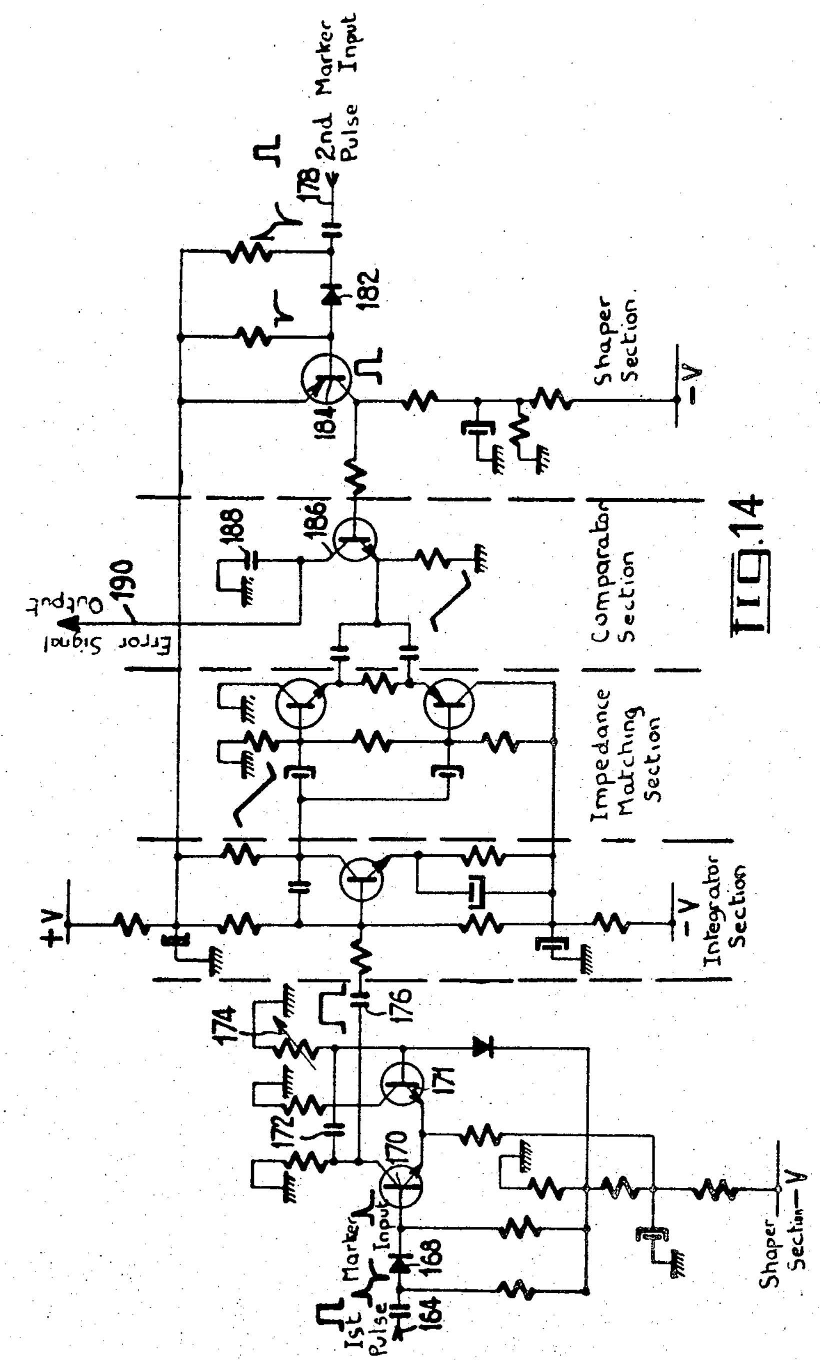
FIG. 14 is a similar diagram of a form of time comparator used in embodiments of the invention for indicating the relative timing between two corresponding marker pulses from different color channels.

The time comparator shown in FIG. 14 serving to develop an error output indicative of the sense and magnitude of the time displacement between two marker pulses, e.g. any one of the time comparators 82–88 in FIG. 3, is somewhat more complicated. A first one of the two marker pulses to be time-compared is applied from first input 164 to a differentiating R-C network which produces a pair of sharp positive and negative pulses corresponding to the rising and falling sides of the input pulse. A clipper circuit comprising a diode 168 then suppresses the negative differentiated pulse. The positive pulse is applied to the base of one of a pair of oppositely mounted transistors 170 and 171 connected in a monostable circuit including a capacitor 172 connected between the collector of transistor 170 and the base of transistor 171. Said base is also connected through a potentiometer 174 to ground. Adjustment of this potentiometer varies the duration of the positive pulse appearing on the collector of transistor 170 when triggered by the sharp differentiated pulse applied to its base. Generally the potentiometer 174 is adjusted so that the output pulse appearing on the collector of transistor 170 is about twice as long as the original marker pulse applied to input 164. This elongated pulse is applied by way of a capacitor 176 and a resistance to an integrator network section, similar to the corresponding section in FIG. 13. The linear sawtooth wave developed in the integrating section is then applied by way of an impedance matching section similar to the one in FIG. 13, to the emitter of a comparator transistor 186 forming part of a comparator section similar to the one in FIG. 13.

Meantime the other of the two marker pulses being compared is applied from a second input 178 of the circuit to a differentiating R-C network followed by a clipper diode 182. This diode is so poled as to clip off the positive differentiated pulse and pass the negative pulse which corresponds to the trailing edge of the input marker pulse. This negative pulse after amplification in an amplifier transistor 184 is applied through resistance to the base of comparator transistor 186. The collector of this transistor is connected through a capacitor 188 to ground and also connected to error signal output line 190.

It will be apparent from the description of operation of the circuit of FIG. 13 given above, that the circuit of FIG. 14 operates to produce an error output from line 190 which is indicative of the time position of the trailing edge of the marker pulse applied to input 178 with respect to the linear sawtooth wave produced from the elongated pulse commencing at the leading edge of the marker pulse applied to input 164. Thus said error output signal will indicate in sense and magnitude the relative time displacement between the pair of marker pulses to be compared.

It will be understood that the circuits described with reference to FIGS. 13 and 14 are merely examples of suitable time discriminator and comparator circuits well-known in electronics and that various other suitable circuits may be used for the purposes of the invention.

As illustrated in FIGS. 2, 2A and 2B, the mask 8 used in the invention, preferably made from a suitable transparent material such as methyl methacrylate resin (e.g. "Plexiglas"), has 45° mitre cut edges 202 and 204 shown on FIGURES 2A and 2B which are partial sectional views, on an enlarged scale, on the plane A—A and B—B, of the edges of the mask around the central rectangular cutout 20.

Both faces of the disk are painted black except thin straight lines 206 and 208 laying on the opposite face of the disk from the mitre cut edges 202 and 204, and parallel to these edges. FIGURE 2 represents the said opposite face of the disk; 24, 25, 24', 25' are the said straight lines 206 and 208 which define the vertical and horizontal sides, respectively, of the rectangular reference frame.

The side of the mask where the straight lines 204 and 206 lay is facing the beam-splitter system and these straight lines are lighted for example by light bulbs, not shown, introduced in four holes standing near the periphery of the mask and represented on FIGURE 2 by four circles.

The light beam within the transparent material of the mask is represented on FIGURES 2A and 2B by dashes with arrows.

In an embodiment of the invention, the rectangular cutout 20 in the mask, defining the picture frame, was 45 cm. in diagonal length. The mask dimensions indicated by letters in FIGS. 2A and 2B had the following values: $a$=0.3 mm., $b$=0.25 mm., $c$=0.6 mm., $d$=0.4 mm. The simultaneous trichrome television system had a 625 line standard with 50 frames per second. The time base signals had the time values as shown in FIGS. 4 and 5.

With the mask dimensions indicated above, the marker pulses had the following lengths: Line scan (start-of-line and end-of-line marker): 0.5 $\mu$s., and frame scan (start-of-frame and end-of-frame marker): 150 $\mu$s.

With these values, the accuracy attainable for the register of the three primary colors by means of the invention is such that corresponding points of the three color fields are separated by less than one thousandth part of the width of the picture, for a loss in modulation depth equal to 3 decibels.

Figure 15:
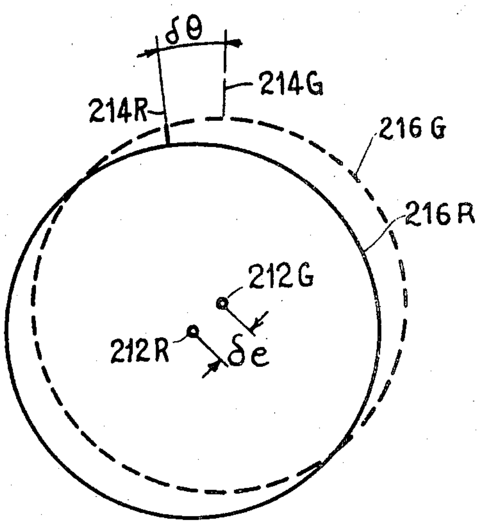
FIG. 15 is a diagram showing the geometry of reference marker means usable according to the invention in the case of spiral rather than rectangular scanning.

The teachings of this invention are applicable mutatis mutandis to any kind of scanning pattern or raster, with or without interlacing, and not necessarily the rectangular unidirectional type of pattern which was shown herein because of its widespread use in television work. In each case, the reference markings serving to generate the marker pulses would assume forms dictated by the particular geometry of the scanning pattern used, and would be easily designed by those familiar with the art. For example, if a circular picture frame were used with spiral scanning, the reference configurations might take the form illustrated in FIG. 15. In this figure, to facilitate comparison with FIG. 6, the markings relating to a color picture selected as a reference are shown in dashed lines and are designated with subscript G, while the markings relating to a non-registering picture are shown in full lines and designated with subscript R. As shown, the markings may in this case include a central circular dot 212 and a peripheral radial segment 214 and possibly also a circumferential line 216. The central mark 212 serves to derive marker pulses for centering the color pictures with respect to one another while the radial segment 214 will produce marker pulses for the angular relative positioning of the pictures. The circumferential line 216 may be used to produce a marker pulse for determining the radial length of the scanning field. The resulting marker pulses as picked up by the various color tubes would be processes to derive error signals in accordance with any of the general arrangements disclosed herein (FIG. 3, 8, 9 or 10) and the error signals would be applied to appropriate control inputs of the scan generators of each or some of the tubes so as to alter the sweep characteristics until the markers coincide. This would, in the instance shown in FIG. 15, involve a bodily or centering shift indicated as $\delta e$, an angular shift $\delta\theta$ and possibly also a variation in radius $\delta r$, not shown.

The invention is applicable to color picture systems including only two or more than three tubes. Where there are only two tubes, an arrangement corresponding to that of FIG. 3 would imply controlling the sweep generators of only one of the tubes. In a television system of the type using four pickup tubes (three primary colors and a brightness of luminance tube) it may be convenient to select the brightness channel as the reference channel to which the marker pulses from the color channels would be compared for deriving the error signals, as described with reference to FIG. 3 or FIG. 8 for example.

While it is found convenient to provide the reference markings on a mask of the general kind described with reference to FIGS. 2, 2A and 2B and inserted in the field lens system 10 ahead of the beam splitter as shown in FIG. 1, the reference markings may be projected on to the pickup tubes in any other desired manner, as by positioning the means carrying said markings outside the optical path of the picture beam, and projecting an image of the same onto the respective mirrors of the beam splitter through a suitable optical arrangement.

A great many other modifications will suggest themselves. For example, auxiliary deflection elements may be provided in the pickup tubes for varying the characteristics of the scan cycles for the purposes of the invention. The deflection elements, here shown as electromagnetic windings, may of course be of the electrostatic plate electrode type, in which case the sweep generators shown in FIG. 11 and 12 would be suitably modified to generate voltage sawtooth waves. It is to be understood that the term "frame" as applied in the specification and claims to the major scanning cycle, should be interpreted as generic to the concepts of "frame" and "field" as these terms are sometimes used e.g. in the case of interlaced scanning.

What I claim is:

1. In an electronic color pick-up system having a plurality of pick-up tubes including means for simultaneously cyclically scanning a common scene projected in different colors on the respective tubes, the provision of:

means defining a common reference pattern positioned to be projected on said tubes and scanned by the scanning means thereof simultaneously with said scene;

said reference pattern including a reference marker line projectable in fixed positional relation to the projection of the scene on each tube externally of said scene, so as to be scanned outside the period in each cycle within which the scene is scanned;

means connected to the tube for developing an error signal in response to a displacement relative to a reference position of the projections of said marker line as scanned by said scanning means of respective tubes, said error signal occurring substantially outside the cyclic period in which said scene is scanned; and means connected for applying said error signal to the scanning means of at least one of said tubes to modify the scanning cycle thereof in a sense to reduce said displacement and thereby maintain register between different color pictures provided by the tubes.

2. The system claimed in claim 1, wherein said pattern comprises a bright line on a dark field surrounding the projected scene.

3. The system defined in claim 1, having optical means including a beam splitter for projecting said common scene in different colors on said tubes, and wherein said reference pattern means comprises a mask device interposed in said optical means ahead of the beam splitter.

4. In an electronic color picture pick-up system having a plurality of pick-up tubes including means for simultaneously cyclically scanning a common scene projected in different colors on the respective tubes, the provision of:

means defining a common reference pattern and projecting said pattern on said tubes to be scanned therein by said scanning means simultaneously with the scanning of said common scene;

said reference pattern including a reference marker line projectable in fixed positional relation to the projection of the scene on each tube externally of said scene, so as to be scanned outside the period in each scanning cycle within which the scene is scanned;

means connected to the tubes for sensing marker signals produced by the respective tubes in response to said projected marker lines and including means producing an error signal in response to a time displacement of the marker signals produced by different tubes relative to a reference marker signal, said error signal occurring outside the period in each cycle within which the scene is scanned;

means connected for applying said error signal to the scanning means of at least one of said tubes to modify the scan cycle thereof in a sense to reduce said displacement and thereby maintain register between said different color pictures.

5. The system defined in claim 2 including time base means controlling said scanning means, blanking means connected to the time base means and producing beam blanking pulses for blanking said scanning means between scanning cycles, transmitter means connected to transmit to a receiver a composite signal comprising video signal components representative of color pictures from said tubes, synchronizing signal components from said time base means and blanking signal components derived from said beam blanking pulses, said blanking signal components overlapping in time said beam blanking pulses, and wherein said reference pattern is so formed that said marker signals occur outside the time periods of said beam blanking pulses but within the periods of said blanking signal components, whereby said reference pattern is not displayed at said receiver.

6. In an electronic color picture pickup system having a plurality of pickup tubes including means for simultaneously cyclically scanning a common scene projected in different colors on the respective tubes, the provision of:

means defining a common reference pattern and projecting said pattern on said tubes to be scanned therein by said scanning means simultaneously with the scanning of said common scene;

said reference pattern including a reference marker line projectable in fixed positional relation to the projection of the scene on each tube externally of said scene so as to be scanned outside the period in each cycle within which the scene is scanned;

means connected to the tubes for sensing marker signals produced by the respective tubes in response to said projected marker lines;

time discriminator means connected to said sensing means and developing an error signal in response to a time displacement of the marker signal produced in all but one of said tubes with respect to the marker signal produced in said one tube; and means connected for applying said error signal to the scanning means of said all but one tube to modify the scanning cycles therein in a sense to reduce said displacement and thereby maintain register between the color pictures produced by all said tubes.

7. In an electronic color picture pickup system having a plurality of pickup tubes including means for cyclically scanning a common scene projected in different colors on the respective tubes and time base means for controlling said scanning means, the provision of:

means defining a common reference pattern and projecting said pattern on said tubes to be scanned therein by said scanning means simultaneously with the scanning of said common scene;

said reference pattern including a reference marker line projectable in fixed positioned relation to the projection of the scene on each tube externally of said scene so as to be scanned outside the period in each cycle in which the scene is scanned means connected to the tubes for sensing marker signals produced thereby in responce to said common reference pattern;

time discriminator means connected to said sensing means and connected to said time base means and developing an error signal in response to a predetermined discrepancy between a marker signal produced by at least one of said tubes and said time base;

and means connected for applying said error signal to the scanning means of at least said one tube in a sense to reduce said discrepancy.

8. In an electronic color picture pickup system having a plurality of pickup tubes including means for cyclically scanning a common scene projected in different colors on the respective tubes, and time base means controlling said scanning means the provision of:

means defining a common reference pattern and projecting said pattern on said tubes to be scanned therein simultaneously with the scanning of said common scene, said pattern including a start-of-scan-cycle reference marker and an end-of-scan-cycle reference marker projectable is fixed relation relative to the projection of the scene on each tube externally of said scene so as to be scanned outside the period in each cycle within which the scene is scanned;

means connected to the tubes for sensing marker signals produced thereby in response to said start-of-cycle and end-of-cycle reference markers including means producing a first error signal in response to a time displacement between the start-of-cycle marker signals produced by different tubes and means producing a second error signal in response to a time displacement between the end-of-cycle marker signals produced by different tubes;

and means connected for applying one of said error signals to the scanning means of at least one of said tubes to modify the means sweep level developed by scanning means during a scan-cycle and means connected for applying the other error signal to the scanning means of at least one of said tubes to modify the sweep amplitude of said scanning means whereby to reduce said error signals and maintain register between the color pictures produced by the tube.

9. The system claimed in claim 8, wherein said one error signal is said first error signal and said other error signal is said second error signal.

10. The system claimed in claim 8, wherein said scanning means include line scanning means and frame scanning means, said pattern includes a start-of-line, an end-of-line, a start-of-frame and an end-of-frame reference markers, said error-signal producing means produce a first and a second line error signals in response respectively to a time displacement between the start-of-line and end-of-line marker signals produced by different tubes, and a first and a second frame error signals in response respectively to a time displacement between the start-of-frame and end-of-frame marker signals produced by different tubes, and said error signal applying means are connected for applying said line error signals to the line scanning means of at least one of said tubes and said frame error signals to the frame scanning means of at least one of said tubes.

11. The system claimed in claim 10 wherein said reference pattern comprises a rectangle surrounding the projected scene, and said start-of-line and end-of-line reference markers comprise a first pair of opposite sides of said rectangle and said start-of-frame and end-of-frame reference markers comprise the other pair of opposite sides of said rectangle.

12. The system claimed in claim 8, wherein the means producing at least one of said error signals comprises time discriminator means connected to said sensing means and developing an error signal in response to a time displacement of a marker signal produced in all but one of said tubes with respect to a corresponding marker signal produced in said one tube.

13. The system claimed in claim 8, wherein the means producing at least one of said error signals comprises time discriminator means connected to said sensing means and connected to said time base means and developing an error signal in response to a predetermined discrepancy between a marker signal produced by at least one of said tubes and said time base.

14. In an electronic video system having a cathode tube including a target and electro beam means for cyclically scanning said target, said scanning means comprising means generating a sweep wave of electric energy during recurrent scan-cycles, said scan cycle including blanking periods the combination comprising:

means determining a time reference for the timing of said scan cycle;

a control line connected with the scanning means for modifying the characteristics of said sweep wave;

means defining a marker point recurrently scannable by the electron beam during the scan cycles within said blanking periods;

means responsive to the scanning by said electron beam of said marker point in the recurrent scan cycle thereof for producing a marker signal;

time discriminator means having an input connected to said time reference means and another input connected to receive said marker signal and producing an error signal in the absence of a prescribed time relationship between the marker signal and the time reference; and means connected for applying said error signal to said control line to modify the sweep wave in a sense to reduce said error signal whereby to maintain a prescribed timing of the scan cycle.

15. In an electronic video system having a cathode tube including a target and electron beam for cyclically scanning said target, said scanning means comprising means generating a sweep wave of electric energy during recurrent scan cycles, said cycle including blanking periods, the combination comprising:

means determining a time reference for the timing of said scan cycle;

a first control line connected with the scanning means for modifying the means energy level of said sweep wave;

a second control line connected with the scanning means for modifying the sweep amplitude of said sweep wave;

means defining a first and second marker points scannable by the electron beam recurrently during the scan cycles within said blanking periods;

means responsive to the scanning by the electron beam of said first point in the recurrent scan cycle thereof for producing a first marker signal;

means responsive to the scanning by the electron beam of said second point in the recurrent scan cycle thereof for producing a second marker signal;

first time discriminator means having an input connected to said time reference means and another input connected to receive said first marker signal and producing a first error signal in the absence of a prescribed first time relationship between said first marker signal and said time reference;

second time discriminator means having an input connected to said time reference means and another input connected to receive said second marker signal and producing a second error signal in the absence of a prescribed second time relationship between said second marker signal and said time reference;

means connected for applying one of said error signals to said first control line; and means connected for applying the other error signal to said second control line;

whereby to modify both the mean energy level and the amplitude of said sweep wave in a sense to reduce each of said error signals, and whereby to maintain a prescribed timing of the scan cycle.

16. In an electronic color picture pick-up system having a plurality of pick-up tubes including means for cyclically scanning a common scene projected in different colors on the respective tubes, and time base means controlling said scanning means, the provision of:

means defining a common reference pattern and projecting said pattern on said tubes to be scanned therein simultaneously with the scanning of said common scene, said pattern including a start-of-scan-cycle reference marker and an end-of-scan-cycle reference marker;

means connected to the tubes for sensing marker signals produced thereby in response to said start-of-cycle and end-of-cycle reference markers including means producing a first error signal in response to a time displacement between the start-of-cycle marker signals produced by different tubes and means producing a second error signal in response to a time displacement between the end-of-cycle marker signals produced by different tubes; at least one of said error signal-producing means comprising delay means connected to receive a related one of said marker signals produced by at least one of said tubes and imparting a delay thereto corresponding to a prescribed time lapse between said marker signals as determined by said time base means, and time discriminator means connected to receive said delayer related marker signal and the other one of said marker signals and producing an error signal in response to a time displacement therebetween; and means connected for applying one of said error signals to the scanning means of at least one of said tubes to modify the mean sweep level developed by said scanning means during a scan cycle and means connected for applying the other error signal to the scanning means of at least one of said tubes to modify the sweep amplitude of said scanning means; whereby to reduce said error signals and maintain register between the color pictures produced by the tubes.

17. In an electronic color picture pick-up system having a plurality of pick-up tubes including means for cyclically scanning a common scene projected in different colors on the respective tubes, and time base means controlling said scanning means, the provision of:

means defining a common reference pattern and projecting said pattern on said tubes to be scanned therein simultaneously with the scanning of said common scene, said pattern including a start-of-scan-cycle reference marker and an end-of-scan-cycle reference marker;

means connected to the tubes for sensing marker signals produced thereby in response to said start-of-cycle and end-of-cycle reference markers including means producing a first error signal in response to a time displacement between the start-of-cycle marker signals produced by different tubes and means producing a second error signal in response to a time displacement between the end-of-cycle marker signals produced by different tubes;

at least one of said error signal-producing means comprising time discriminator means connected to said sensing means and said time base means and developing an error signal in response to a predetermined discrepancy between a marker signal produced by a selected one of said tubes and said time base, and further time discriminator means connected to said sensing means and developing an error signal in response to a time displacement of a marker signal produced in each of the remaining tubes with respect to a corresponding marker signal produced in said selected tube;

means connected for applying the error signal developed by said first mentioned time discriminator means to the scanning means of said selected tube and means connected for applying the error developed by said further time discriminator means to the scanning means of said remaining tubes;

one of said error signal-applying means being connected to modify the mean sweep level developed by the related scanning means during a scan cycle and the other error signal-applying means being connected to modify the sweep amplitude of the related scanning means; whereby to reduce said error signals and maintain register between the color pictures produced by the tubes.

References Cited

UNITED STATES PATENTS

| | | | |
|---|---|---|---|
| 2,594,382 | 4/1952 | Bedford | 178—5.2 |
| 2,611,816 | 9/1952 | Darke | 178—5.2 |
| 3,089,978 | 5/1963 | Bendell et al. | 178—5.4 XR |

ROBERT L. GRIFFIN, *Primary Examiner.*

RICHARD MURRAY, *Assistant Examiner.*